US011154915B2

(12) United States Patent
Cauthen et al.

(10) Patent No.: US 11,154,915 B2
(45) Date of Patent: Oct. 26, 2021

(54) PINE STRAW CLEANING MACHINE

(71) Applicant: Innovative Agricultural Technologies, LLC, Carthage, NC (US)

(72) Inventors: Benjamin Keith Cauthen, Mount Pleasant, NC (US); William Keith Marsh, Stedman, NC (US); Alex Todd Greeson, Winston-Salem, NC (US); Matthew Grayson Parker, Carthage, NC (US); Benjamin Lewis Cranfill, Suffolk, VA (US)

(73) Assignee: Innovative Agricultural Technologies, LLC, Carthage, NC (US)

( * ) Notice: Subject to any disclaimer, the term of this patent is extended or adjusted under 35 U.S.C. 154(b) by 0 days.

(21) Appl. No.: 16/820,912

(22) Filed: Mar. 17, 2020

(65) Prior Publication Data
US 2020/0298289 A1 Sep. 24, 2020

Related U.S. Application Data

(60) Provisional application No. 62/819,749, filed on Mar. 18, 2019.

(51) Int. Cl.
*C09K 17/52* (2006.01)
*B08B 5/02* (2006.01)
*B07B 4/02* (2006.01)

(52) U.S. Cl.
CPC ............... *B08B 5/023* (2013.01); *B07B 4/02* (2013.01); *C09K 17/52* (2013.01)

(58) Field of Classification Search
None
See application file for complete search history.

(56) References Cited

U.S. PATENT DOCUMENTS

| 4,286,427 A * | 9/1981 | van der Lely ......... A01D 84/00 56/370 |
| 5,403,235 A * | 4/1995 | Baumgarten ........... A01F 12/30 209/139.1 |
| 2012/0048975 A1* | 3/2012 | Gitschel .................. B07B 15/00 241/24.13 |

* cited by examiner

*Primary Examiner* — Eric W Golightly
(74) *Attorney, Agent, or Firm* — Coats & Bennett, PLLC (57) ABSTRACT

A machine for removing debris from pine straw is described. The machine comprises a conveyor system, a doffer, a debris-pine straw separation zone, and a clean pine straw zone. The conveyor system and doffer thin, spread and fluff the pine straw, as well as control the flow of pine straw to the separation zone. A system of air is directed through the separation zone and engages pine straw and debris discharged into the separation zone and effectively separates the debris from the pine straw, after which the pine straw is directed from the separation zone to the clean pine straw zone.

6 Claims, 10 Drawing Sheets

FIG. 9

PINE STRAW CLEANING MACHINE

CROSS-REFERENCE TO RELATED APPLICATION

This application claims priority under 35 U.S.C. § 119(e) from the following U.S. provisional application: Application Ser. No. 62/819,749 filed on Mar. 18, 2019. That application is incorporated in its entirety by reference herein.

FIELD OF THE INVENTION

The present invention relates to machines and processes for removing debris from pine straw.

BACKGROUND OF THE INVENTION

Pine straw is a popular landscape mulch used widely by homeowners and landscapers. Typically, pine straw is harvested and baled in a pine forest. What might be surprising is that for the most part pine straw is cleaned and harvested by hand. That is, hand labor removes debris, such as pine cones, sticks, bark, hardwood leaves, sand and grass from the pine straw. Thereafter, the cleaned pine straw is gathered and typically baled. There are numerous drawbacks and concerns with this laborious process. First, labor is scarce, and labor costs are substantial and continue to rise. Moreover, the hand cleaning of pine straw is extremely inefficient. All of this adversely impacts the cost of pine straw to consumers and landscapers and in the end limits the market for pine straw.

Therefore, there has been and continues to be a need to at least partially mechanize the harvesting of pine straw and particularly the process of cleaning the pine straw prior to baling.

SUMMARY OF THE INVENTION

The present invention relates to a pine straw cleaning machine for receiving pine straw containing debris and removing the debris from the pine straw. A moveable conveyor system forms a part of the machine. It includes an entry end and a discharge end. Further, the conveyor system is configured to receive pine straw at the entry end and to generally thin the pine straw as the pine straw moves from the entry end to the discharge end. A doffer is disposed over the conveyor system. The doffer is configured in one embodiment to engage the oncoming pine straw and declump and fluff the pine straw, spread the pine straw across the conveyor system and limit and control the flow of pine straw past the doffer. Further, the machine comprises a pine straw-debris separation zone formed on the machine downstream of the conveyor system for receiving pine straw conveyed on the conveyor system. An air separation system including a fan is disposed on the machine. The air separation system is configured to generate a system of air and direct the system of air through at least a portion of the separation zone where the system of air separates the pine straw from the debris and produces clean pine straw.

In addition, the present invention relates to a method for cleaning pine straw containing debris. This method or process includes directing the pine straw containing the debris onto or into a conveyor system and moving the pine straw along the conveyor system towards a discharge point. As the pine straw moves along the conveyor system, the method entails thinning the pine straw as the pine straw moves across the conveyor system towards the discharge point. Further, the method includes engaging the pine straw on the conveyor system with a rotating doffer and spreading the pine straw across the conveyor system and limiting the flow of pine straw past the doffer. The pine straw is discharged from the conveyor system into the separation zone. The method or process entails directing a system of air through the separation zone and separating the debris from the pine straw to produce clean pine straw.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, the pine straw cleaning machine is shown therein and indicated generally by the numeral 10. As discussed below, the pine straw cleaning machine 10 is designed to clean debris, such as pine cones and sticks, from pine straw. The term "debris" is defined as unwanted material and includes, but not limited to, pine cones, sticks, grass, sand, leaves, etc. Pine straw containing the debris is fed into the machine and subjected to a conditioning and metering process that facilitates the downstream removal of debris. Once conditioned, the pine straw is subjected to a separation process where debris is separated from the pine straw, yielding a clean pine straw. The term "clean pine straw" means that substantial debris has been removed from the pine straw. 100% or nearly 100% removal of debris is not feasible.

In one embodiment, the pine straw cleaning machine 10 comprises a conveyor system indicated generally by the numeral 12. Conveyor system 12 includes a pine straw entry end and a pine straw discharge end. As will be discussed in more detail below, the conveyor system 12 is configured to thin or generally reduce the density of the pine straw as it is conveyed from the entry end to the discharge end. The term "configured to" is used in numerous places in the application and claims and is defined to mean "designed to".

A rotatively driven doffer 14 is mounted above the conveyor system 12. As the pine straw is conveyed on the conveyor system 12, the doffer 14 engages the pine straw and is designed to perform a number of functions. First, the doffer 14 breaks up clumps of pine straw. Secondly, the doffer tends to spread the pine straw transversely across the conveyor system 12. Thirdly, the doffer 14 acts as a metering device and is used to limit the flow of pine straw through the doffer.

Formed on the pine straw cleaning machine 10 downstream of the conveyor system 12 is a separation zone 16. As detailed below, the separation zone 16 is where the pine straw is cleaned. That is, as the pine straw passes through the separation zone 16, debris is removed from the pine straw, producing the clean pine straw.

The cleaning process is performed in substantial part by an air separation system indicated generally by the numeral 18. Incorporated into the air separation system 18 are a fan 18A and a duct 18B. Air separation system 18 is configured to generate a system of air and direct that air into and through the separation zone 16. This system of air engages the pine straw discharged into the separation zone 16 and effectively removes debris from the pine straw and produces the clean pine straw which is collected on the pine straw cleaning machine 10.

The present invention also entails a method or process for cleaning debris from pine straw. Here pine straw is loaded onto the conveyor system 12 and conveyed to a discharge point. As the pine straw is conveyed towards the discharge point, the pine straw is conditioned for separation through a thinning process. In some embodiments, clumps of pine straw are broken up and the pine straw is generally spread across the conveyor system 12. Further, the flow of pine straw on the conveyor system is metered and to some extent controlled, again for the purpose of facilitating downstream separation. After this conditioning, the pine straw is discharged into the separation zone 16. A focused system of air is directed into the separation zone 16. In the separation zone 16, the system of air engages the pine straw. Debris generally being heavier than pine needles, falls out of the pine straw onto a debris collector on the machine 10. The clean pine straw is lifted and carried by the system of air to a clean pine straw collector and ultimately discharged from the machine 10.

Viewing the pine straw cleaning machine 10 in more detail, it is mobile and can be moved and maneuvered in a pine forest so that it can be conveniently positioned for a cleaning operation. In the embodiment illustrated, machine 10 includes a support 20 supported by a series of wheels 22. This is but one example of how the machine can be mobilized. It is appreciated by those skilled in the art that various mobile undercarriages can be incorporated into the machine and that the machine may even be self-propelled.

A basic frame structure is supported on the support 20. The frame structure supports and houses various parts and components of the machine to be subsequently described. About the front of support 20 there is provided a space for accommodating a generator 24 and a control box 26 that houses electrical controls, etc.

Now turning to the conveyor system 12, it comprises a first inclined conveyor 12A and a second generally horizontal conveyor 12B. See FIG. 5, for example. Both conveyors are of the endless belt type. As a part of the conditioning process, conveyors 12A and 12B are designed to thin or reduce the density of the pine straw traveling towards the discharge end of the second conveyor 12B. This is achieved in one embodiment by varying the speed (i.e. belt speed) of the conveyors 12A and 12B. Generally the speed of the second conveyor 12B is set and maintained at a speed greater than the first conveyor 12A. In one example, conveyor 12A is run at a speed of approximately 0.3-1.5 ft./s and the second conveyor 12B is run at a speed of approximately 7 ft./s. These speeds can vary, of course. However, it is preferable that the speed of the second conveyor 12B be substantially greater than the speed of the first conveyor 12A. Because the second conveyor 12B is faster than the first conveyor 12A, the thickness of the pine straw traveling on the conveyors 12A and 12B is reduced in proportion to the speed ratio between the two conveyors, as governed by the principle of conservation mass.

Figure 1:
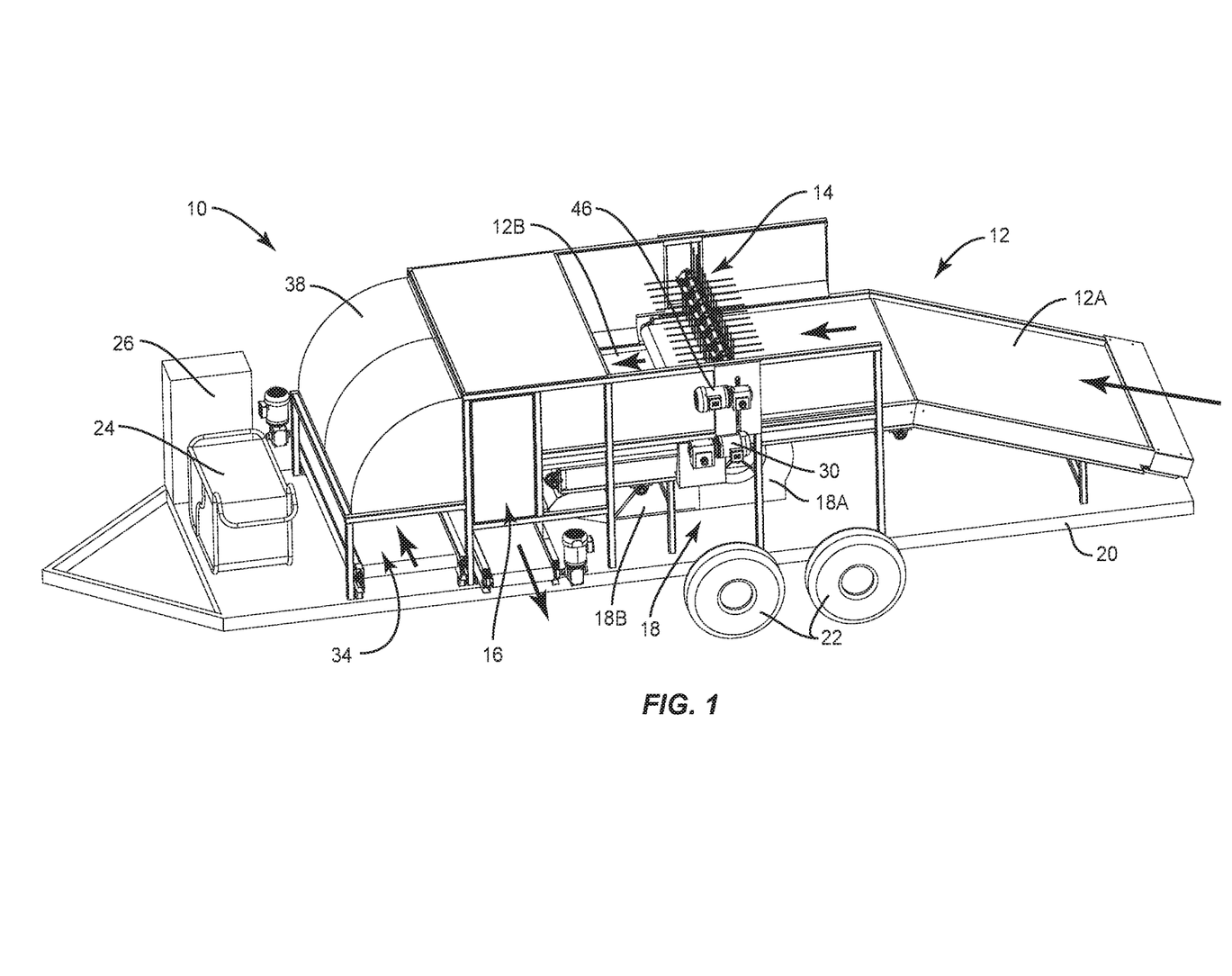
FIG. 1 is a perspective view of the pine straw cleaning machine viewed from the left side.

In one embodiment, each of the conveyors 12A and 12B is driven by at least one AC motor that is operatively connected to a variable frequency drive (VFD). Note in FIG. 1 where the first conveyor 12A is driven by motor 30 through a right angle gear box. The second conveyor 12B could also be driven by a motor operatively connected to a variable frequency drive. In one embodiment, the second conveyor 12B is also driven by motor 30. The particular drive arrangement is not shown but through a chain or belt drive, for example, the second conveyor 12B can be driven by motor 30. By particularly selecting the sprocket or sheave used in this drive arrangement, the speed of the second conveyor 12B can be controlled and made to operate at a speed substantially greater than the speed of the first conveyor 12A. It is appreciated that the conveyor drives and their arrangements can vary and that there are numerous suitable ways of driving conveyors 12A and 12B. As understood and appreciated by those skilled in the art, the conveyor system 12 is not necessarily limited to belt-type conveyors or specific conveyor designs. For example, the first conveyor or initial conveyor could be of the rotary pickup type which might gather and pick up the pine straw from the ground and transfer the pine straw to another conveyor.

Figure 5:
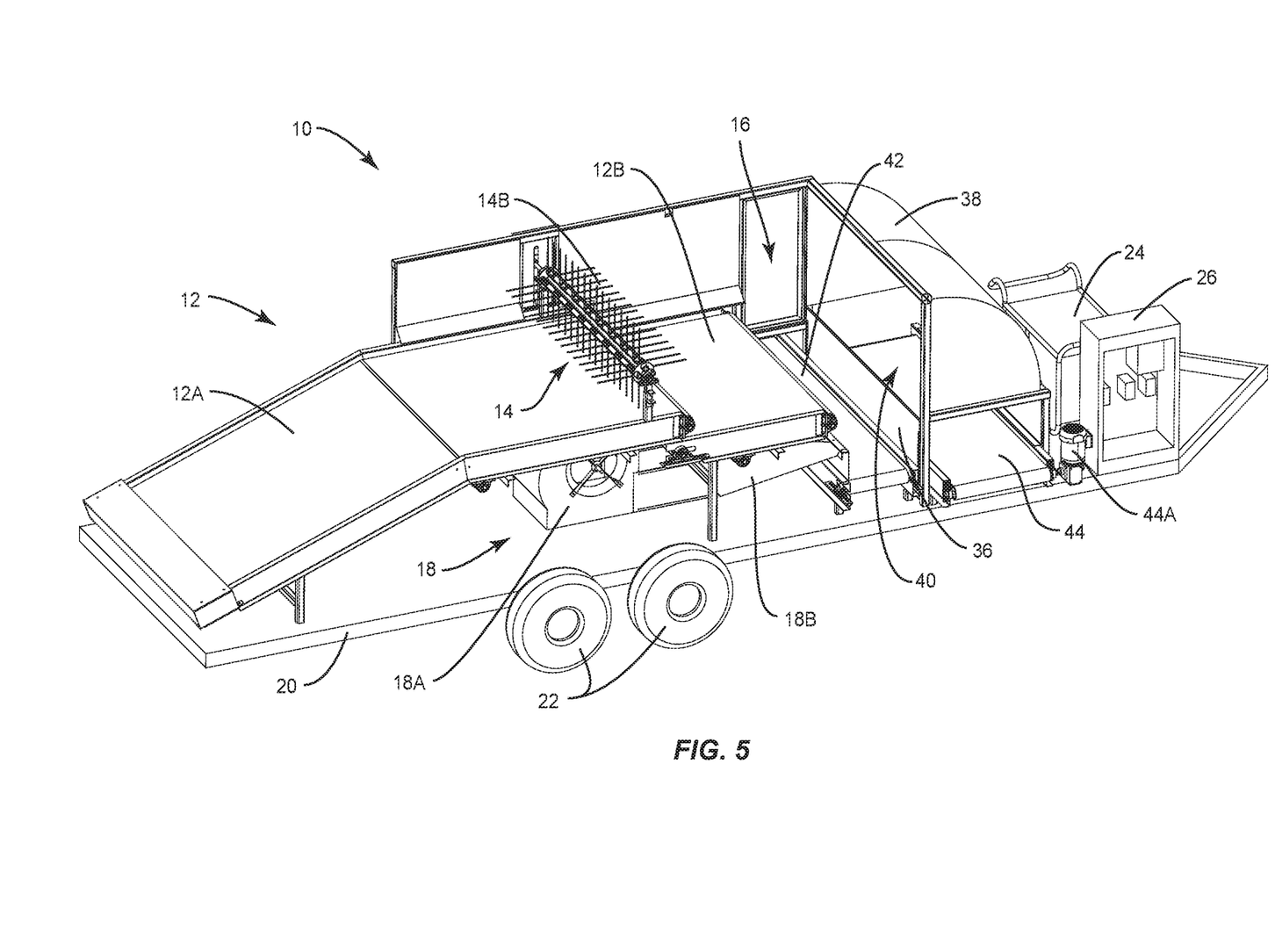
FIG. 5 is a perspective view of the machine similar to FIG. 4 but with side panels removed to better illustrate the internal components of the machine.
Figure 6:
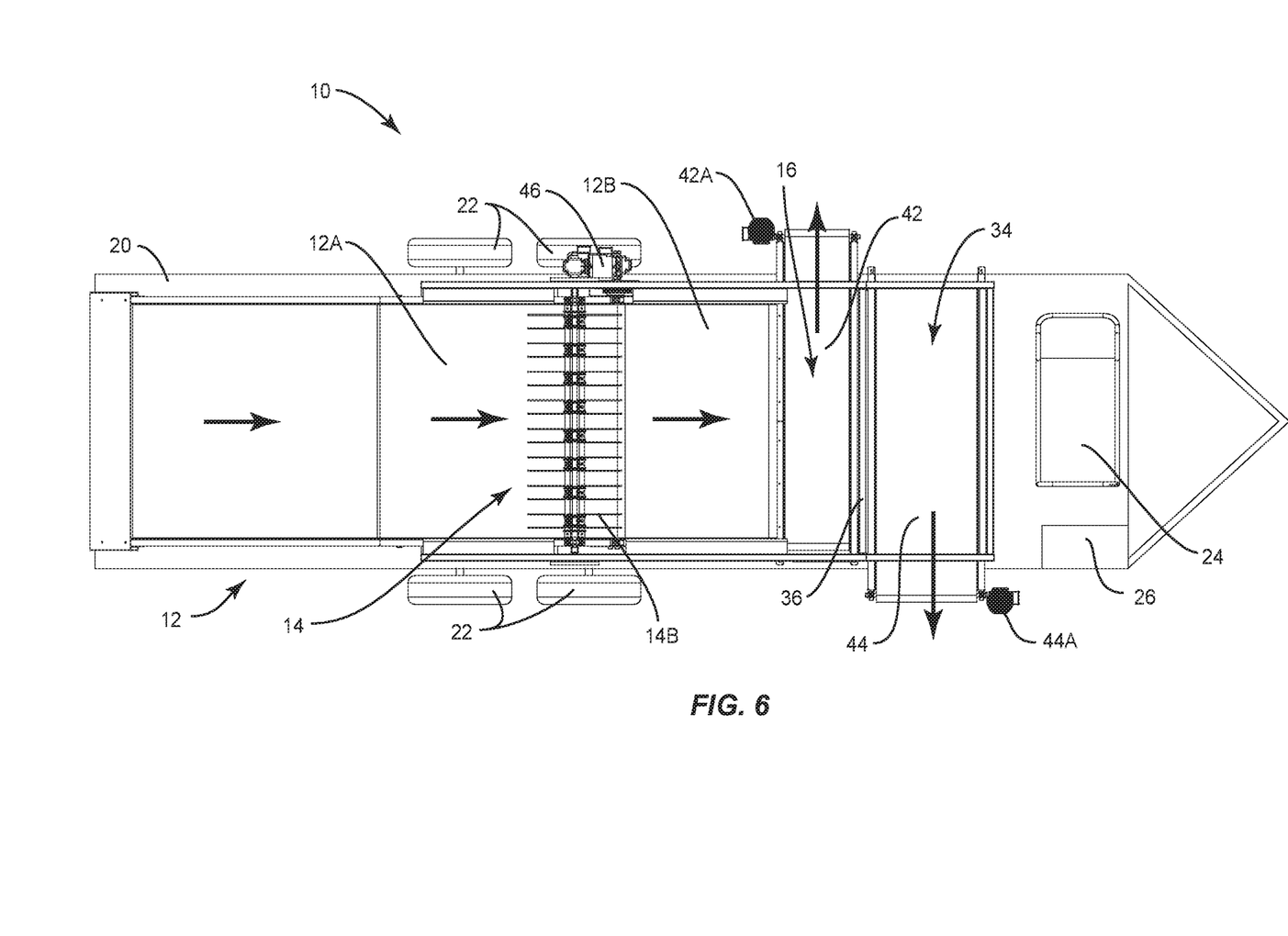
FIG. 6 is a top plan view of the machine.
Figure 7:
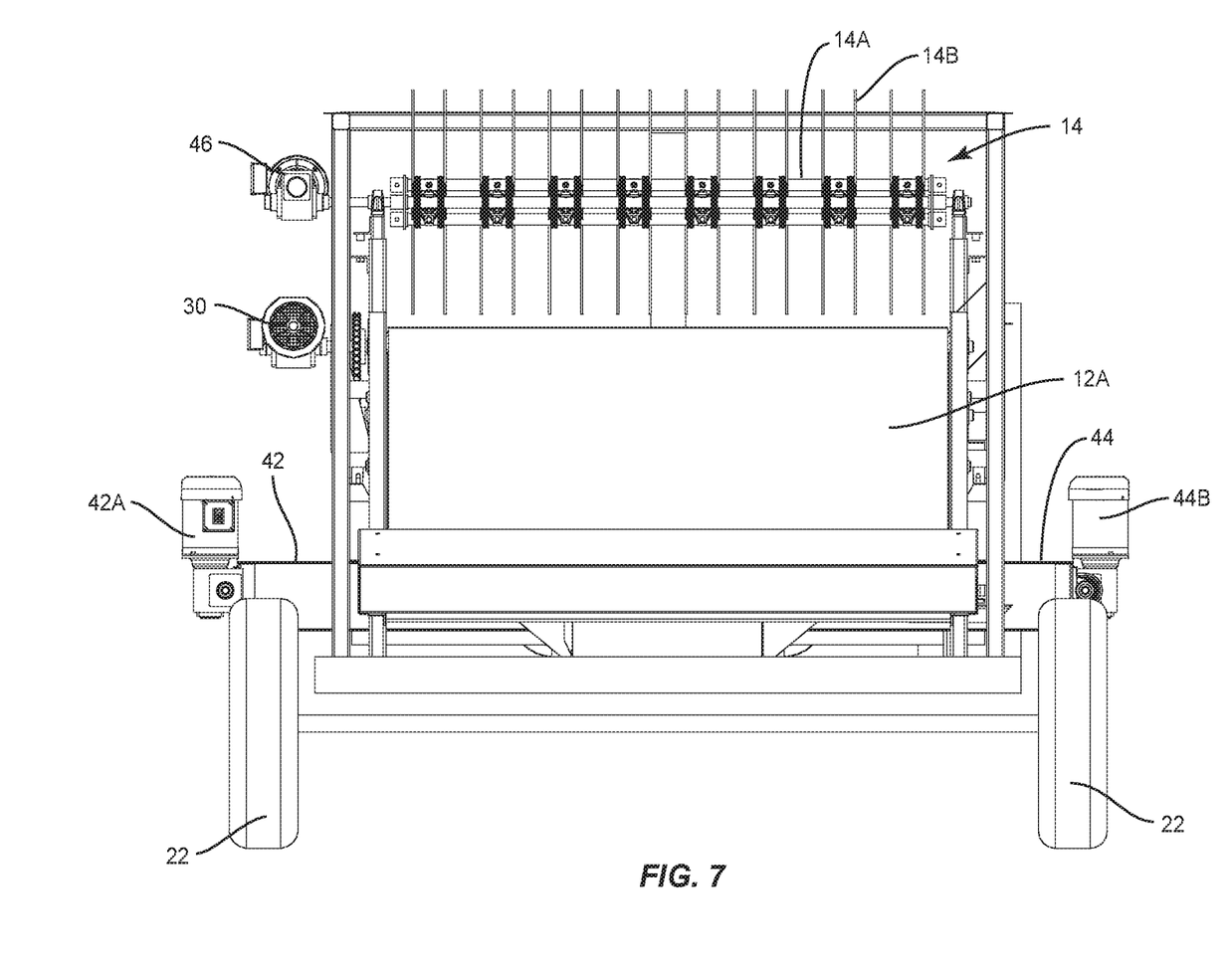
FIG. 7 is a rear elevational view of the machine.
Figure 7A:
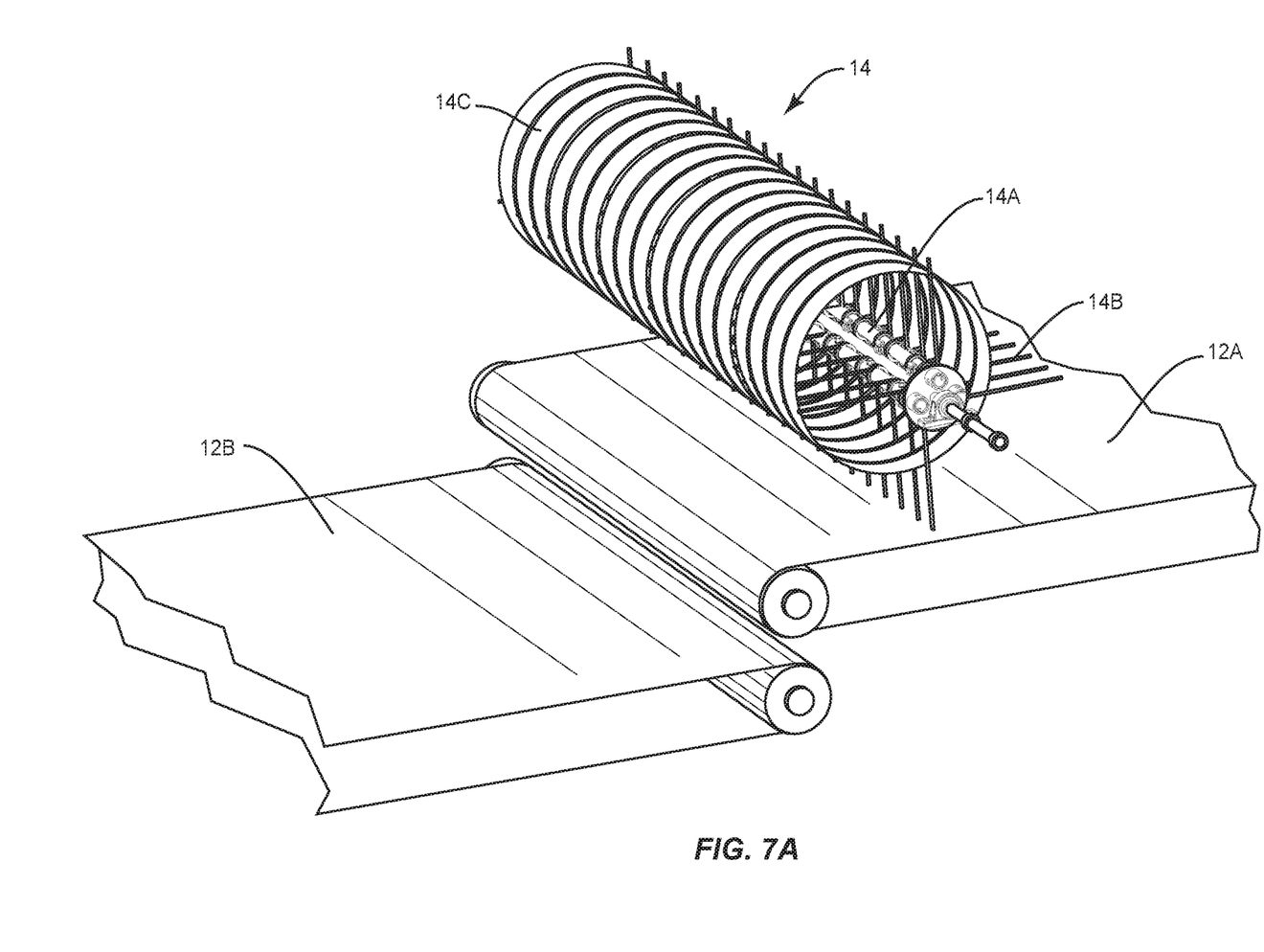
FIG. 7A is a fragmentary schematic illustration showing the doffer including a slotted shield for stripping pine straw from the tines of the doffer.

Doffer 14 is illustrated in the drawings, particularly in FIGS. 5-7. Doffer 14 extends transversely across conveyor 12A and is driven through a 90° gear box by a variable speed motor 46. In the embodiment illustrated, doffer 14 is disposed adjacent the discharge end of conveyor 12A. A vertically adjustable rotor forms a part of the doffer 14. The adjustability in doffer height and speed allows the machine to process unclean pine straw of varying conditions. The rotor in turn includes a plurality of circumferentially spaced and transversely extending bars 14A. See FIG. 7. Each bar 14A has secured thereto a plurality of laterally spaced tines 14B that project outwardly from the bar. Tines 14B may slightly flex and as such are sometimes referred to as spring tines.

As viewed in FIG. 5, for example, the doffer 14 is rotatively driven counterclockwise. This means that as the tines 14B move through the lower portion of the doffer 14, they tend to move in the same direction as the underlying conveyor 12A. Hence, conveyor 12A conveys the pine straw into the rotating doffer 14 and the doffer 14 engages the pine straw. This results in the doffer performing a number of functions. It tends to break up clumps of pine straw, fluff the pine straw, and in the process tends to spread the pine straw across the underlying conveyor 12A. It also functions as a metering device to control or limit the flow of pine straw past the doffer. That is, by varying and controlling the rotational speed of the doffer 14, this tends to vary the flow of pine straw discharged by the underlying conveyor 12A. Doffer tines 14B pull pine straw into a slotted curved sheet metal shield 14C and release dirty pine straw at a rate that the conveyor system 12 allows. The slotted shield 14C is oriented with respect to the axis of the doffer 14 such that the tines project outwardly from the slotted shield on the upstream side of the doffer and retract relative to the shield on the downstream side of the doffer. This enables the tines 14B to engage and pick up the pine straw on the upstream side of the doffer 14 and release the pine straw from the tines on the downstream side of the doffer. The doffer 14 allows pine straw to be conveyed from the first conveyor to the second conveyor in a thin consistent layer. This provides a consistent material flow rate throughout the conditioning process and insures high efficiency during air separation. The design of the doffer 14 can vary. Other devices and mechanisms can be used to declump, fluff and thin the pine straw, as well as control or limit the flow of pine straw along a conveyor. In any event, the term "doffer" as used herein is defined to mean a rotary device designed to be disposed adjacent a conveyor and designed to declump, fluff or spread pine straw on a conveyor or designed to limit the flow of pine straw through the device or mechanism.

Separation zone 16 is a space located downstream of the conveyor system 12 where debris is separated from the pine straw. Separation zone 16 begins adjacent the discharge end of conveyor 12B and extends a selected distance towards the front of support 20. In addition, the separation zone 16 generally spans the width of the conveyor system 12 and the space of the separation zone occupies a selected height. Hence, pine straw discharged from conveyor 12B is discharged into the separation zone 16. In the lower portion of the separation zone 16 is a debris collector 42 which will be discussed subsequently. In any event, pine straw discharged into the separation zone 16 is subjected to a separation process that causes the debris in the pine straw to fall out of the pine straw onto the debris collector 42 in the bottom portion of the separation zone 16.

Figure 2:
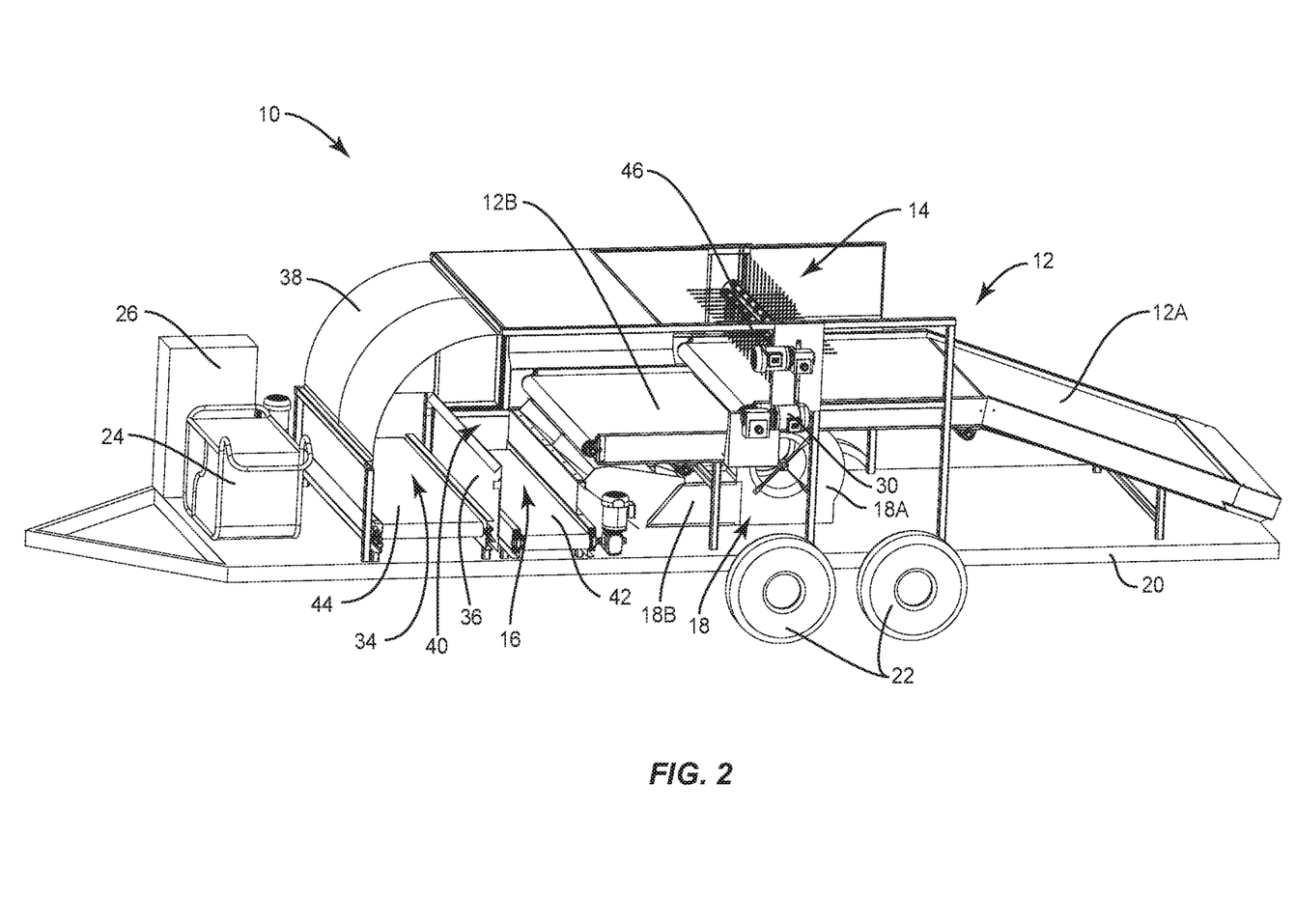
FIG. 2 is a perspective view of the machine that is similar to FIG. 1 but with side panels removed to better illustrate internal components of the machine.

Downstream of the separation zone 16 is a section or zone where clean pine straw is collected. This section is referred to as a clean pine straw zone 34. Clean pine straw zone 34 extends transversely across machine 10 and has a predetermined length and height. Note that the upper portion of the clean pine straw zone 34 is enclosed by a curved housing 38. Clean pine straw zone 34 also includes a collector 44 to be subsequently discussed. Separation zone 16 and clean pine straw section 34 are separated by a baffle 36. See FIG. 2. Baffle 36 terminates short of the height of the separation zone 16. Baffle 36 is vertically adjustable. This is a significant and useful feature. Adjusting the height of baffle 36 enables machine 10 to accommodate different pine straw conditions. An opening 40 is formed above the upper terminal edge of the baffle 36. Through opening 40, the separation zone 16 and the clean pine straw zone 34 are open to each other, permitting clean pine straw to fly from the separation zone 16 into the clean pine straw zone 34.

Figure 3:
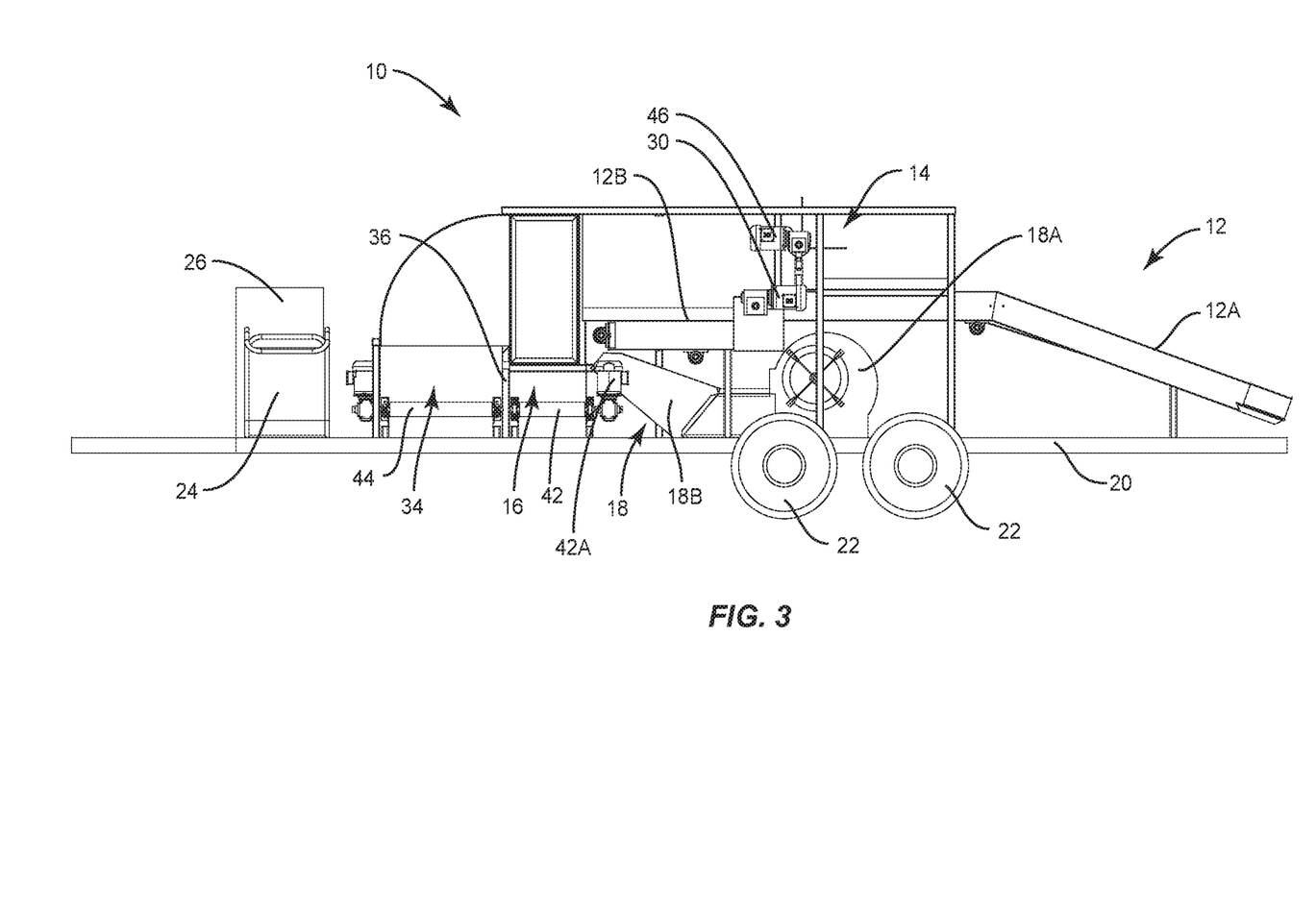
FIG. 3 is a side elevational view of the machine with the left side panels being removed to better illustrate the internal components of the machine.
Figure 4:
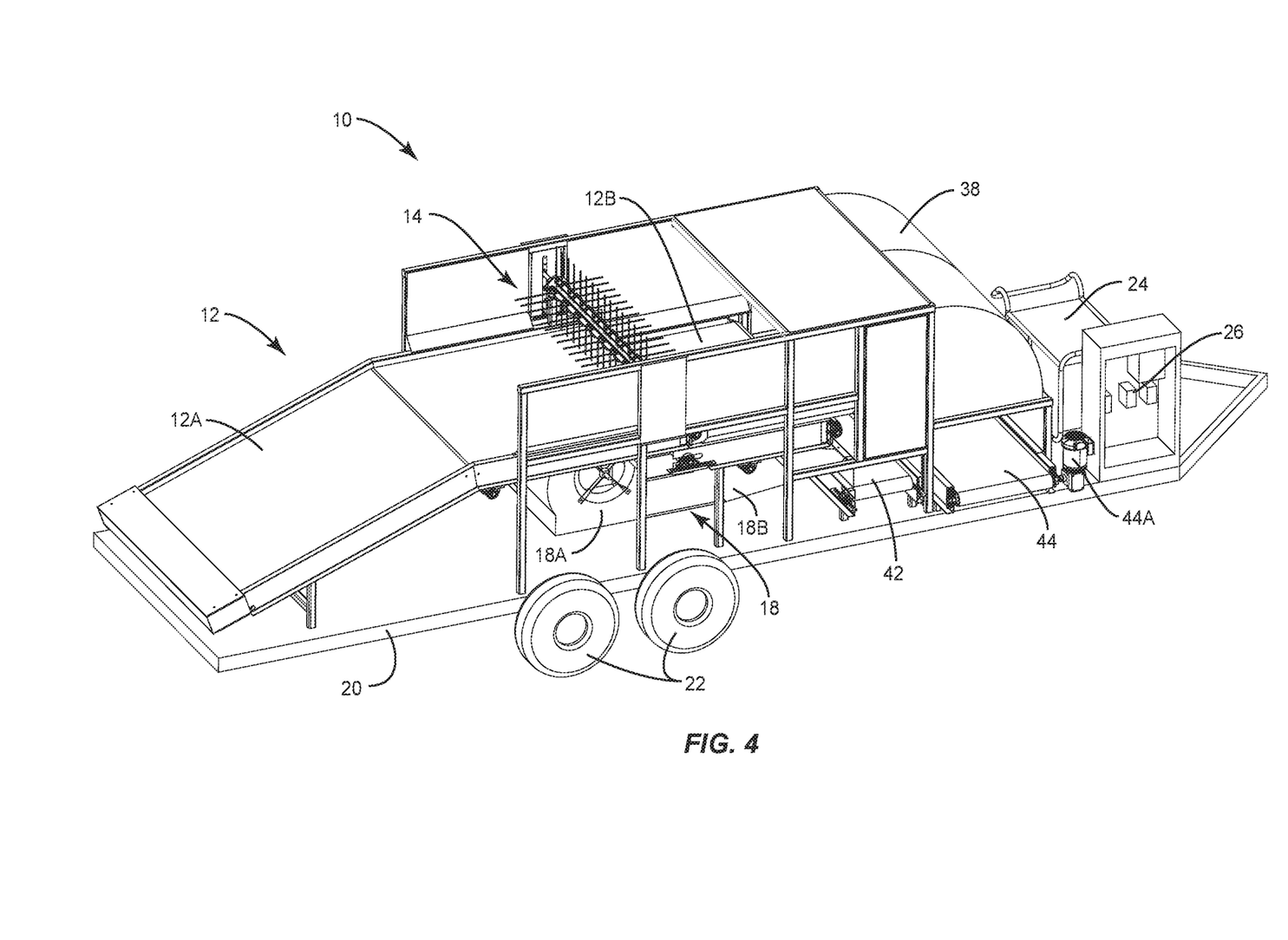
FIG. 4 is a perspective view of the machine viewed from the right side.

As noted above, the debris collector is located in a lower portion of the separation zone 16 while the clean pine straw collector is located in the lower portion of the clean pine straw zone 34. Various structures and mechanisms can be employed to collect and discharge the debris and clean pine straw from the machine 10. For example, angled ramps can be provided in the separation zone 16 and clean pine straw zone 34 to collect and laterally discharge the debris and clean pine straw from the machine 10. Preferably the clean pine straw is discharged from one side of the machine 10 while the debris is discharged from the other side of the machine. In one embodiment and the embodiment shown in the drawings, the collectors are in the form of cross-conveyors 42 and 44. Cross-conveyor 42 functions to collect separated debris and convey the separated debris out of the left side of the machine 10. Generally, cross-conveyor 44 disposed in the clean pine straw zone 34 functions to collect the clean pine straw and convey it out the right side of the machine 10. Note the provision of various panels adjacent cross-conveyors 42 and 44 that function to retain debris or pine straw on the respective conveyors and assures that substantially all the debris in pine straw is appropriately discharged from the machine 10. See, for example, FIGS. 2 and 5. There are various ways appreciated by people skilled in the art to drive and control the speed of the cross-conveyors 42 and 44. In one embodiment, both of the cross-conveyors 42 and 44 can be driven by AC motors and their speeds controlled by variable frequency drives. Noted in FIG. 3, cross-conveyor 42 is driven by motor 42A. Likewise, as shown in FIG. 4, cross-conveyor 44 is driven by motor 44A.

Air separation system 18, as noted above, includes fan 18A and duct 18B. As seen in FIG. 3 in this particular embodiment, fan 18 is a squirrel cage fan and is disposed generally beneath the conveyor system 12. Fan 18A is typically driven by a variable speed motor. Duct 18B is connected to the fan 18A and extends forwardly towards the separation zone 16. Note that substantial portions of the duct 18B underlie the conveyor system 12. From the fan 18A, duct 18B flares outwardly to occupy a width generally equal to the width of the conveyor system 12. It is appreciated by those skilled in the art that the air separation system, including the fan 18A and the duct 18B, can assume various designs and configurations in the machine. Air separation system 18 illustrated in the drawings is one example.

Note that a forward portion of duct 18B is angled upwardly. This angled portion of duct 18B includes a terminal end that terminates adjacent the separation zone 16. Hence the system of air generated by the fan 18A exits the terminal end of the duct 18B at an angle. In one embodiment, this angle is approximately 45° but could vary. Fan 18A and duct 18B are configured to generate a focused stream of air (sometimes referred to as a system of air) that enters the separation zone 16 at a point slightly below the discharge end of conveyor 12B. This focused stream of air enters the separation zone 16 at an angle and engages the pine straw being discharged by the conveyor 12B. This focused stream of air tends to maintain the pine needles airborne while the heavier debris, such as pine cones and sticks, fall out of the air stream onto the cross-conveyor 42. This focused stream of air not only maintains the pine needles (cleaned pine straw) airborne but also conveys the clean pine straw via the air stream through the opening 40 and over the panel 36 into the clean pine straw zone 34. Here the clean pine straw falls onto cross-conveyor 44, after which it is conveyed out one side of the machine 10.

Mounted about a front portion of the support 20 is the generator 24 for generating electricity utilized to drive the various electric motors employed in the pine straw cleaning machine. Generator 24 can be of the diesel or gas type. Disposed adjacent the generator 24 is a control box 26 that houses a control system employed to control the various motors (and hence various conveyors and fan) employed in the pine straw cleaning machine 10.

Figure 9:
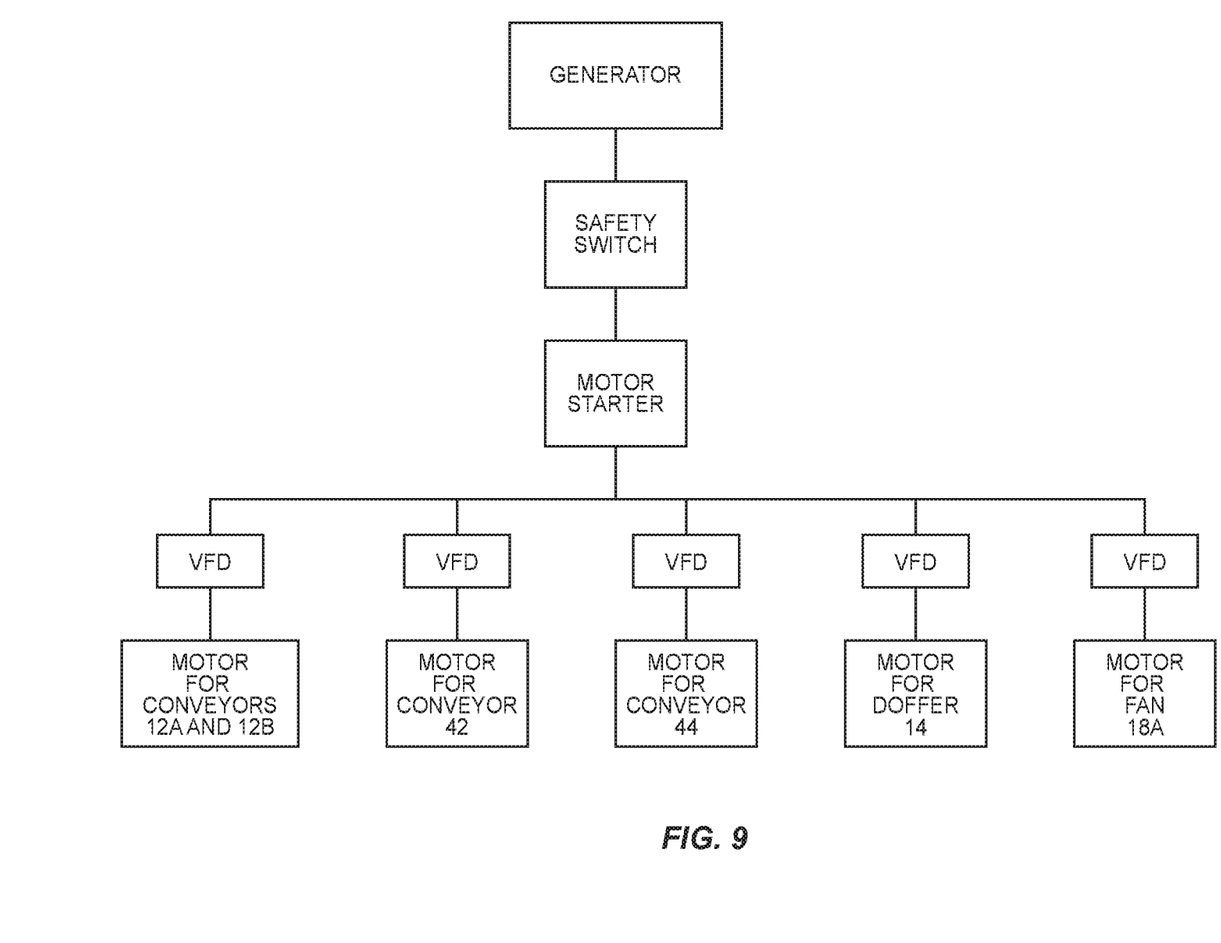
FIG. 9 is an electrical schematic diagram showing various electrical motors and variable frequency drives used on the pine straw cleaning machine.

Various drive systems and controls for the conveyors and fan can be employed in the pine straw cleaning machine 10. One exemplary design is shown in FIG. 9 which is an electrical and power transfer schematic. Generator 24 generates electricity that is directed through a fused safety switch that protects the electric components of the system from current overload. The safety switch also allows for lockout tagout while machine maintenance is being performed. Current then enters the controller housing 26 and is directed to a motor starter that provides a means for emergency shutoff. Magnetically actuated switches are also wired through the motor starter and will shut off the power to the variable frequency drives (VFDs) if an access door incorporated into the machine 10 is opened. Electrical current is directed from the motor starter to the various VFDs that control the motor speed of the various conveyors, as well as the fan 18A. Current from the VFDs is directed to the various motors that drive the conveyors and the fan 18A.

Figure 8:
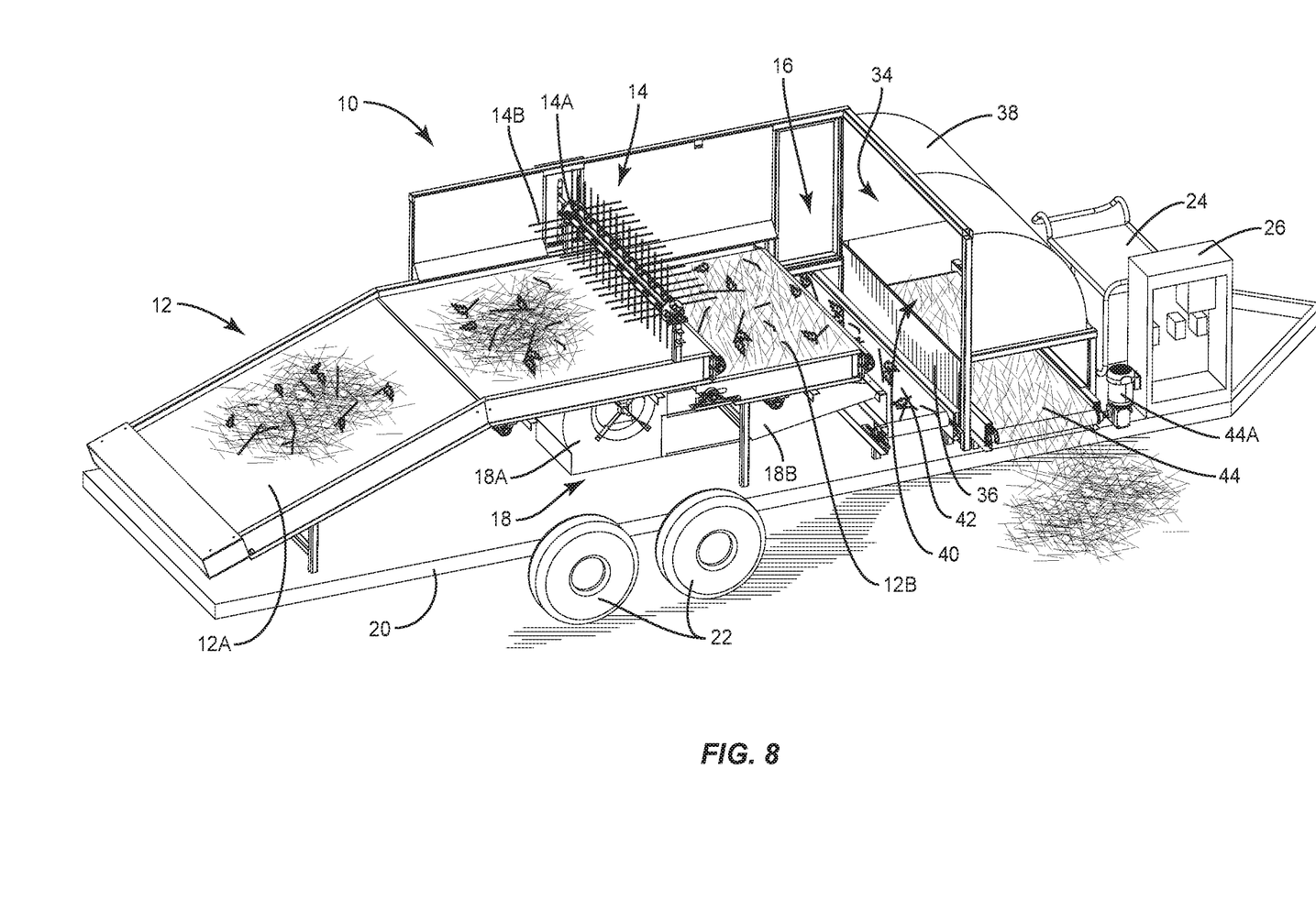
FIG. 8 is a fragmentary schematic illustration showing the basic cleaning process performed by the machine.

FIG. 8 illustrates the process of cleaning pine straw. Pine straw is gathered and loaded onto conveyor 12A. Typically in loading conveyor 12A, the pine straw tends to be bunched and assumes small piles on the conveyor. Expressed differently, the pine straw loaded onto conveyor 12A is typically relatively dense, especially compared to the density of the pine straw discharged by conveyor 12B. As discussed above, conveyor 12A is driven at a relatively slow speed. As the pine straw advances towards conveyor 12B, it engages the rotating doffer 14. Doffer 14, through its tines 14B, engages the pine straw and agitates the pine straw and tends to break up clumps and to spread the pine straw across the width of conveyor 10A. In addition, as discussed above, by controlling the speed of the doffer 14, one can effectively limit or control the flow of pine straw that passes doffer 14.

Once the pine straw on conveyor 12A has been conditioned by the doffer, it is discharged onto an underlying conveyor 12B. Conveyor 12B is driven at a speed substantially greater than the speed of conveyor 12A. This has the effect of thinning the pine straw and making the pine straw less dense on conveyor 12B. Again, all of the conditioning processes occurring on the conveyor system 12 and via the doffer 14 are aimed at facilitating an efficient separation of debris from the pine straw.

This relatively thin and less dense pine straw is discharged from conveyor 12B into the separation zone 16. The focused stream of air produced by the air separation system 18 engages the pine straw as it is discharged from conveyor 12B. As discussed above, the focused steam of air is angled at least slightly upwardly so that the air stream maintains the pine needles or clean pine straw airborne across the separation zone 16 while the heavier debris falls out of the air stream onto the cross-conveyor 42 and is conveyed out the left side of the machine 10. The focused air stream carries the clean pine straw over the vertical panel 36 and into the clean pine straw zone 34 where the clean pine straw falls onto cross-conveyor 44 and is conveyed out the right side of the machine 10.

There are many advantages of the pine straw cleaning machine of the present invention. It reduces hand labor and increases profit margins for pine straw producers. Further, the efficiency of mechanical cleaning improves the overall quality of the pine straw product. Moreover, the pine straw cleaning machine 10 is sufficiently maneuverable to be wheeled through a pine forest and move from one harvesting site to another harvesting side. It is also relatively light and permits the machine to be pulled by a pickup truck.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A pine straw cleaning machine for receiving pine straw containing debris and removing the debris from the pine straw, comprising:
   a moveable conveyor system including a pine straw entry end and a pine straw discharge end;
   wherein the conveyor system is configured to receive pine straw at the entry end and to generally thin the pine straw as the pine straw moves from the entry end to the discharge end;
   a doffer disposed over the conveyor system and configured to engage the pine straw moving on the conveyor system and declump, spread or limit a flow of pine straw past the doffer;
   a pine straw—debris separation zone disposed downstream of the conveyor system for receiving pine straw conveyed on the conveyor system; and
   an air separation system including a fan;
   wherein the air separation system is configured to generate a system of air and direct the system of air through at least a portion of the separation zone where the system of air separates the pine straw from the debris and produces clean pine straw.

2. The pine straw cleaning machine of claim 1 wherein the conveyor system includes first and second driven conveyors with the second conveyor disposed generally downstream of the first conveyor and configured to run at a higher speed than the first conveyor.

3. The pine straw cleaning machine of claim 2 wherein the first conveyor is disposed at an incline with respect to the second conveyor.

4. The pine straw cleaning machine of claim 1 further including a debris collector disposed in the separation zone and a clean pine straw collector disposed downstream of the debris collector.

5. The pine straw cleaning machine of claim 4 further including a baffle separating the debris collector and the clean pine straw collector, and an opening formed above the baffle; and wherein the air separation system is configured to direct the system of air through the separation zone such that the debris falls out of the pine straw onto the debris collector and the clean pine straw is directed over the baffle and through the opening where the clean pine straw is collected by the clean pine straw collector.

6. The pine straw cleaning machine of claim 1 further including a clean pine straw zone disposed downstream of the separation zone; a baffle disposed between the separation zone and the clean pine straw zone; and an opening disposed over the baffle; wherein the air separation system is configured to carry clean pine straw from the separation zone, through the opening over the baffle and into the clean pine straw zone.

* * * * *